(12) United States Patent
Raz et al.

(10) Patent No.: US 7,197,594 B2
(45) Date of Patent: Mar. 27, 2007

(54) CIRCUIT, SYSTEM AND METHOD FOR ENCODING DATA TO BE STORED ON A NON-VOLATILE MEMORY ARRAY

(75) Inventors: Meirav Raz, Even Yehuda (IL); Zeev Cohen, Zichron Yaakov (IL); Alon Marcu, Tel Mond (IL)

(73) Assignee: Infineon Technologies Flash GmbH & Co. KG, Munich (DE)

(*) Notice: Subject to any disclaimer, the term of this patent is extended or adjusted under 35 U.S.C. 154(b) by 341 days.

(21) Appl. No.: 10/667,481

(22) Filed: Sep. 23, 2003

(65) Prior Publication Data

US 2005/0066110 A1   Mar. 24, 2005

(51) Int. Cl.
*G06F 12/02* (2006.01)

(52) U.S. Cl. ........................... 711/103; 711/102; 714/48

(58) Field of Classification Search .................. None
See application file for complete search history.

(56) References Cited

U.S. PATENT DOCUMENTS 6,175,937 B1 * 1/2001 Norman et al. ............. 714/718
2003/0135798 A1 * 7/2003 Katayama et al. .......... 714/710

OTHER PUBLICATIONS

International Search Report PCT/IL04/00783.

* cited by examiner

*Primary Examiner*—Hyung Sough
*Assistant Examiner*—Jasmine Song
(74) *Attorney, Agent, or Firm*—Eitan Law Group

(57) ABSTRACT

The present invention is a method, circuit and system for storing bits on a Non-Volatile Memory ("NVM") array. According to some embodiments of the present invention, a bit scrambling block may rearrange the received block of bits according to a spreading pattern. An error correction code block may generate an error correction code ("ECC") based on either the original block of bits or based on the rearranged block of bits, and a data storing circuit may store in the NVM array the ECC and the block of bits from which the ECC was not derived.

3 Claims, 8 Drawing Sheets

CIRCUIT, SYSTEM AND METHOD FOR ENCODING DATA TO BE STORED ON A NON-VOLATILE MEMORY ARRAY

FIELD OF THE INVENTION

The present invention relates generally to non-volatile memory ("NVM") devices. More particularly, the present invention relates to encoding or rearranging bits to be written to an NVM array.

BACKGROUND OF THE INVENTION

Non-Volatile Memory ("NVM") cells come in a variety of cell structure, including "Floating Gate" and "Nitride Read Only Memory" ("NROM"). NVM cells generally are formed of transistors with programmable threshold voltages. The transistors have a threshold voltage ("Vt") that is programmed or erased by charging or discharging a charge storage region located between a control gate and a channel in the transistor. Data is written in such memory cells by charging or discharging the charge storage region of the memory cell, so as to achieve threshold voltages corresponding to the data. An NVM cell may either be adapted to store a single bit in a single charge storage region, multiple bits in multiple charge storage regions, or multiple bits using multiple level programming ("MLC"), either in a single or in multiple charge storage regions.

A group of NVM cells may be configured in a variety of array structures, generally having a grid of columns and rows with at least one cell at each intersection. Various NVM array structures may be operated in different modes of operation. For example, NVM cells may be formed and operated as, but not limited to, erasable, programmable read only memories (EPROMs), electrically erasable, programmable read only memories (EEPROMs), and flash EEPROM memory arrays.

Arrays of NVM cells are typically fabricated on a semiconductor substrate adjacent to circuitry adapted to program and read data to and form the array. The programming and reading circuitry may be generically referred to as a controller of coder/decoder. The controller typically has interface lines allowing it to interconnect with applications or digital devices requiring access to the NVM array. Various controllers conform to various standards for communication with outside applications or digital devices, for example the controller may be adapted to communicate using the Smart-Card or MMC standards.

Since NVM based devices have a certain probability of bit read or write errors when being operated, controllers may include "Error Detection" and/or "Error Correction Coding" ("ECC") functionality. NVM chips or devices with built-in error-checking typically use a method known as parity to check for errors. The problem with parity is that it discovers errors but does nothing to correct them. Critical application may need a higher level of fault tolerance, and thus when storing data on an NVM array, controllers may produce an ECC associated with the data being stored and may store the ECC along with the original data. When reading the data from the array, the controller may use the data's associated ECC to recover data lost because of errors produced when either programming or reading the data.

A controller may also include a memory buffer to temporally store data as it is being written to, or read from, the NVM array. Data to be stored on an NVM array may first be stored on the memory buffer, along with the data's associated ECC. Each slice of the memory buffer may be copied to a portion of a row in the NVM array.

In memory arrays composed of dual or multi-charge storage region cells and/or MLCs, where multiple bits may be stored on a single cell, two or more adjacent bits in a slice of the memory buffer may be copied onto a single memory cell on the NVM array. Storage of multiple adjacent bits from a data stream or data block on a single NVM cell may have drawbacks relating to data recovery in the event the cell fails.

SUMMARY OF THE INVENTION

The present invention is a circuit, system and method for rearranging data bits of a data block to be stored on an NVM array. As part of some embodiments of the present invention, the bits may be rearranged (i.e. scramble) either before or during an ECC is generated, while in other embodiments of the present invention, bits may be rearranged after an ECC is generated based on the original bits. According to certain embodiments of the present invention, bits may be stored on the NVM array in the rearranged order, while in other embodiments of the present invention, bits may be stored on the NVM in their original order.

According to embodiments of the present invention, where bits are stored on an NVM array in a rearranged order, when reading bits from the NVM array, the read bits may be once again rearranged, in an inverse manner to that by which the data bits were rearranged before storing (i.e. unscrambled), in order to retrieve the original data bits. The original bits may be used to perform an ECC check and a correction function for the read bits.

According to embodiments of the present invention, where the bits are stored on an NVM array in their original order, when reading the bits from the NVM array, the read bits may be once again rearranged, in the same manner by which the data bits were rearranged before generating the ECC. The rearranged bits may be used in order to perform an ECC check and a correction function for the read bits.

BRIEF DESCRIPTION OF THE DRAWINGS

The subject matter regarded as the invention is particularly pointed out and distinctly claimed in the concluding portion of the specification. The invention, however, both as to organization and method of operation, together with containers, features, and advantages thereof, may best be understood by reference to the following detailed description when read with the accompanying drawings in which:

Figure 1:
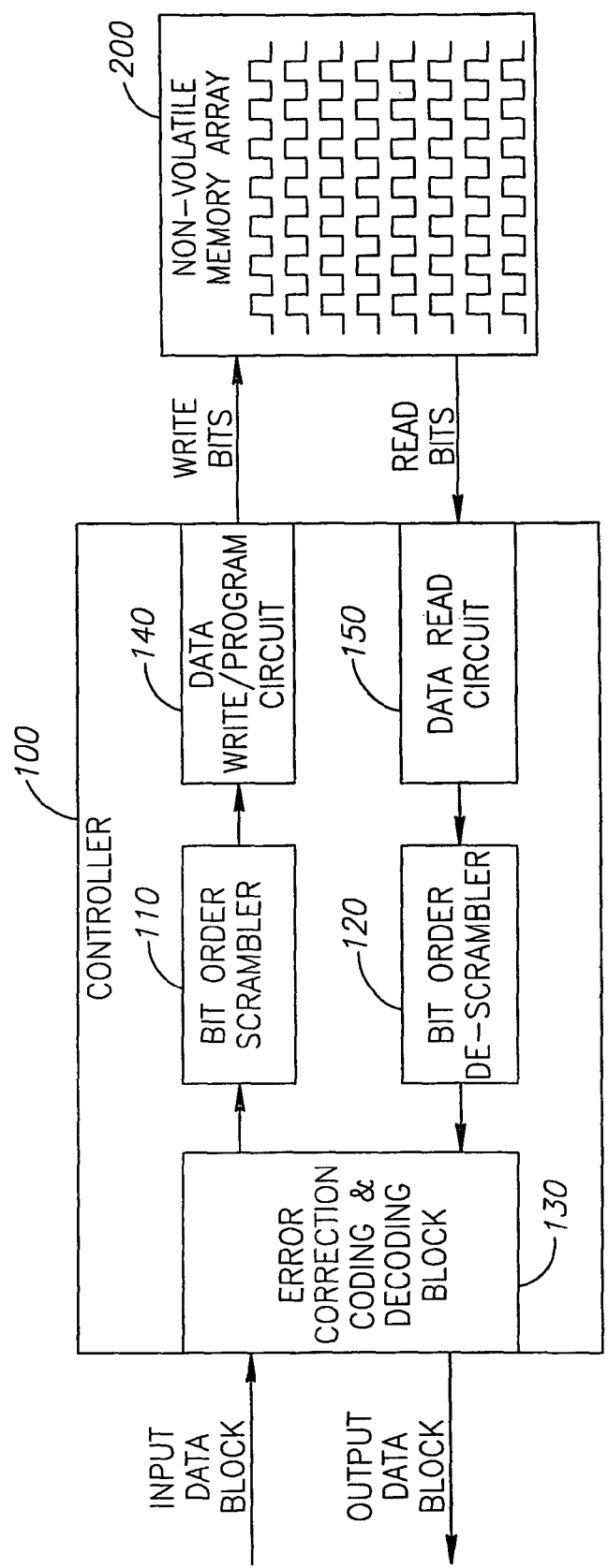
FIG. 1 is a block diagram showing an NVM array Controller with Bit Scrambler and Error Correction Coding blocks according to some embodiments of the present invention through which data may be store on an NVM array in a scrambled manner.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

The present invention is a circuit, system and method for rearranging data bits of a data block to be stored on an NVM array. As part of some embodiments of the present invention, the bits may be rearranged (i.e. scrambled) according to a spreading pattern either before or during an ECC is generated, while in other embodiments of the present invention, bits may be rearranged after an ECC is generated based on the original bits. According to certain embodiments of the present invention, bits may be stored on the NVM array in the rearranged order, while in other embodiments of the present invention, bits may be stored on the NVM in their original order.

According to embodiments of the present invention, where bits are stored on an NVM array in a rearranged order, when reading bits from the NVM array, the read bits may be once again rearranged, in an inverse manner to that by which the data bits were rearranged before storing (i.e. unscrambled), in order to retrieve the original data bits. The original bits may be manipulated by the ECC and a correction function for the read bits may be performed.

According to embodiments of the present invention, where the bits are stored on an NVM array in their original order, when reading the bits from the NVM array, the read bits may be once again rearranged according to the spreading pattern, in the same manner by which the data bits were rearranged before generating the ECC. The rearranged bits may be manipulated by the ECC and a correction function for the read bits may be performed.

Figure 2:
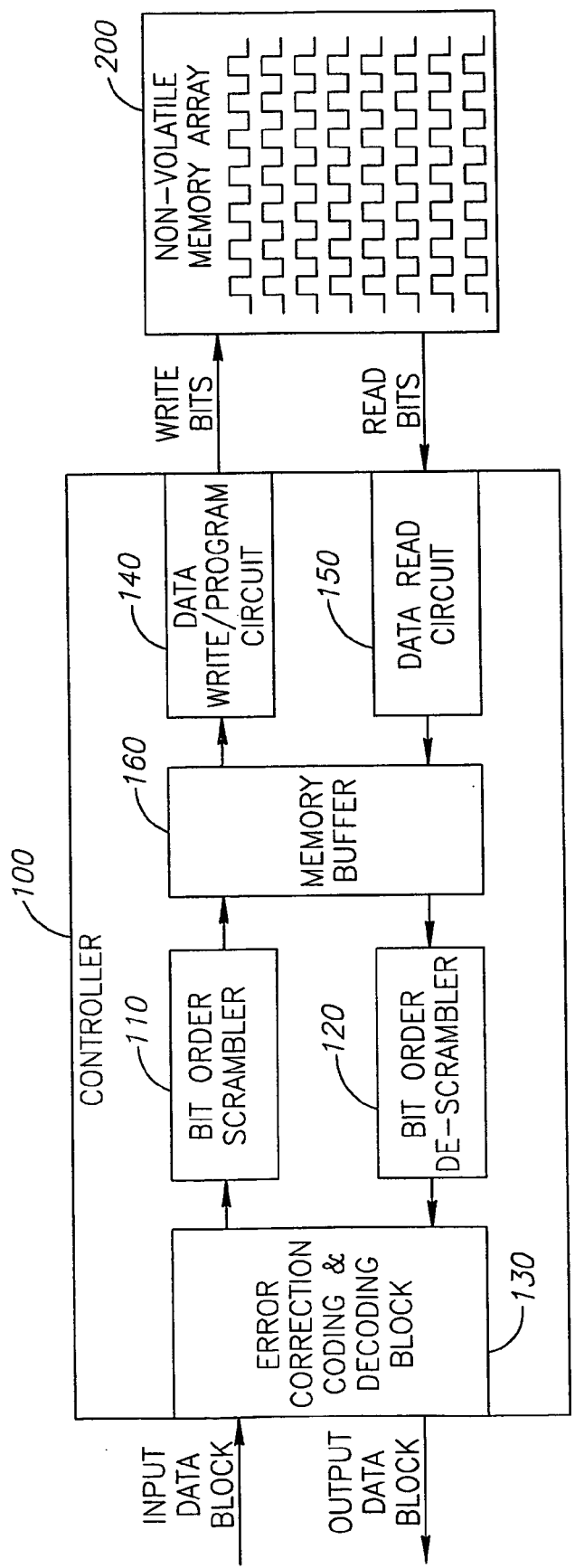
FIG. 2 is a block diagram showing an NVM array Controller with Bit Scrambler and Error Correction Coding blocks and a temporary Memory Buffer according to some embodiments of the present invention through which data may be store on an NVM array in a scrambled manner.

Turning now to FIG. 1, there is shown a block diagram of a NVM array Controller 100 according to some embodiments of the present invention, including a Bit Order Scrambler block 110, Error Correction Coding/Decoding block 130, a Bit Order De-scrambler block 120, Data Write/Program Circuit 140, and Data Read Circuit 150. According to embodiments of the present invention relating to the block diagram of FIG. 1, a data block may be stored on an NVM Array 200 with its bits scrambled or rearranged according to a bit spreading pattern. FIG. 2 shows essentially the same controller configuration as shown in FIG. 1, along with an additional element, a Memory Buffer 160.

Figure 8:
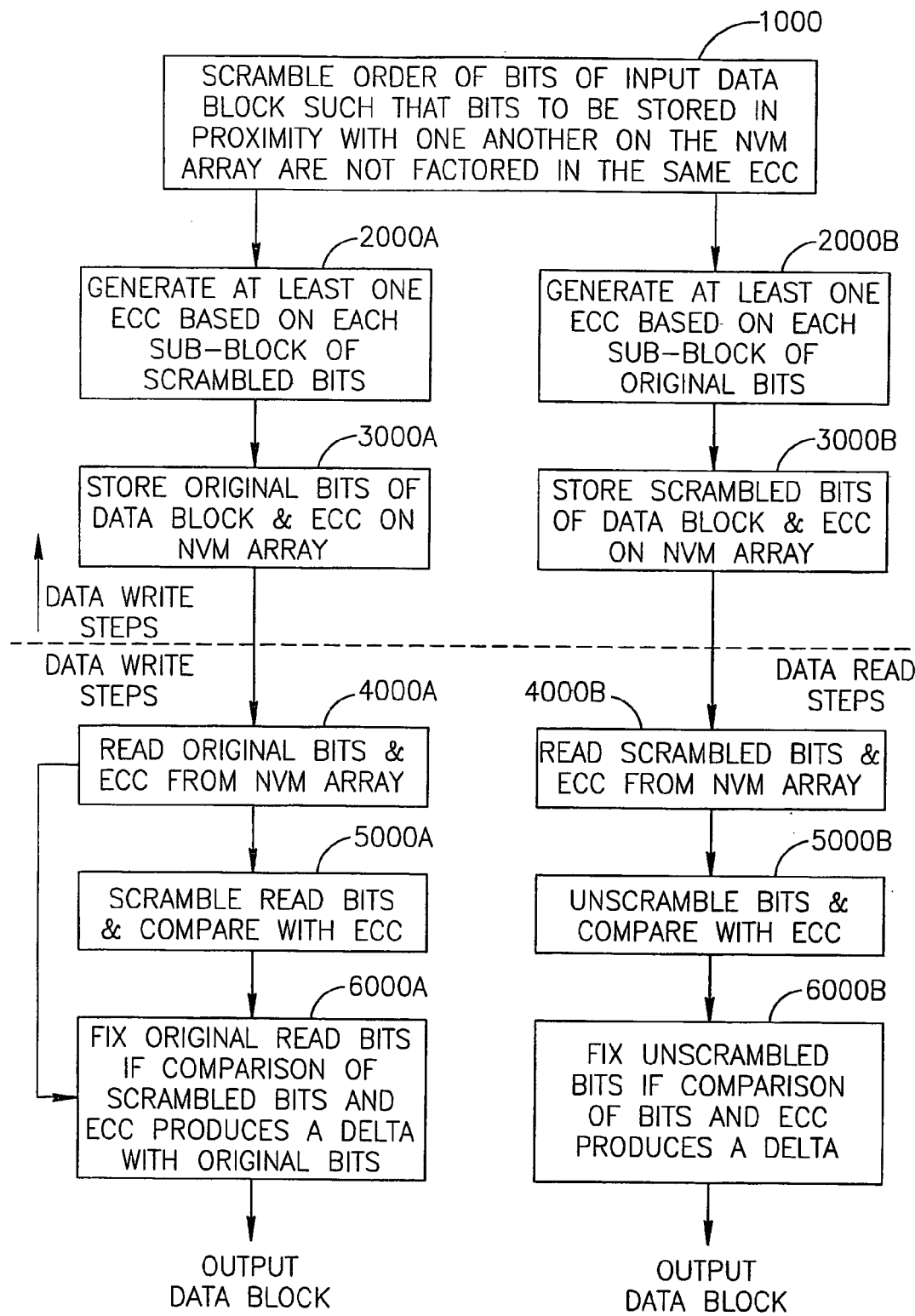
FIG. 8 is a flow diagram showing the steps of two separate methods for storing and retrieving bits according to various embodiments of the present invention.

Both FIGS. 1 and 2 may be operated in accordance with some of the steps of the method outlined in the flow diagram of FIG. 8. An input data block may enter the controller 100 for preparation to be copied to or stored on the NVM Array 200. For purposes of this example, the data block may be eight consecutive Bytes (i.e. 64 bits), a standard size when dealing with NVM arrays. However, one of ordinary skill in the art would certainly understand that the selection of the data block size is arbitrary and that the present invention is not restricted to any predefined data block size.

As part of being prepared for copying to the NVM Array 200, the data block may be examined or manipulated by an Error Correction Coding block 130 which may generate an ECC based on the original data block (step 2000B). Error correction coding is well known in the art, and any error correction coding circuit or method, presently known or to be devised in the future, is applicable to present invention. Either before or after an ECC code is generated based on the original data block (step 2000B), a scrambled version of the data block may be produced by the Bit Order Scrambler block 110 (Step 1000).

Figure 4:
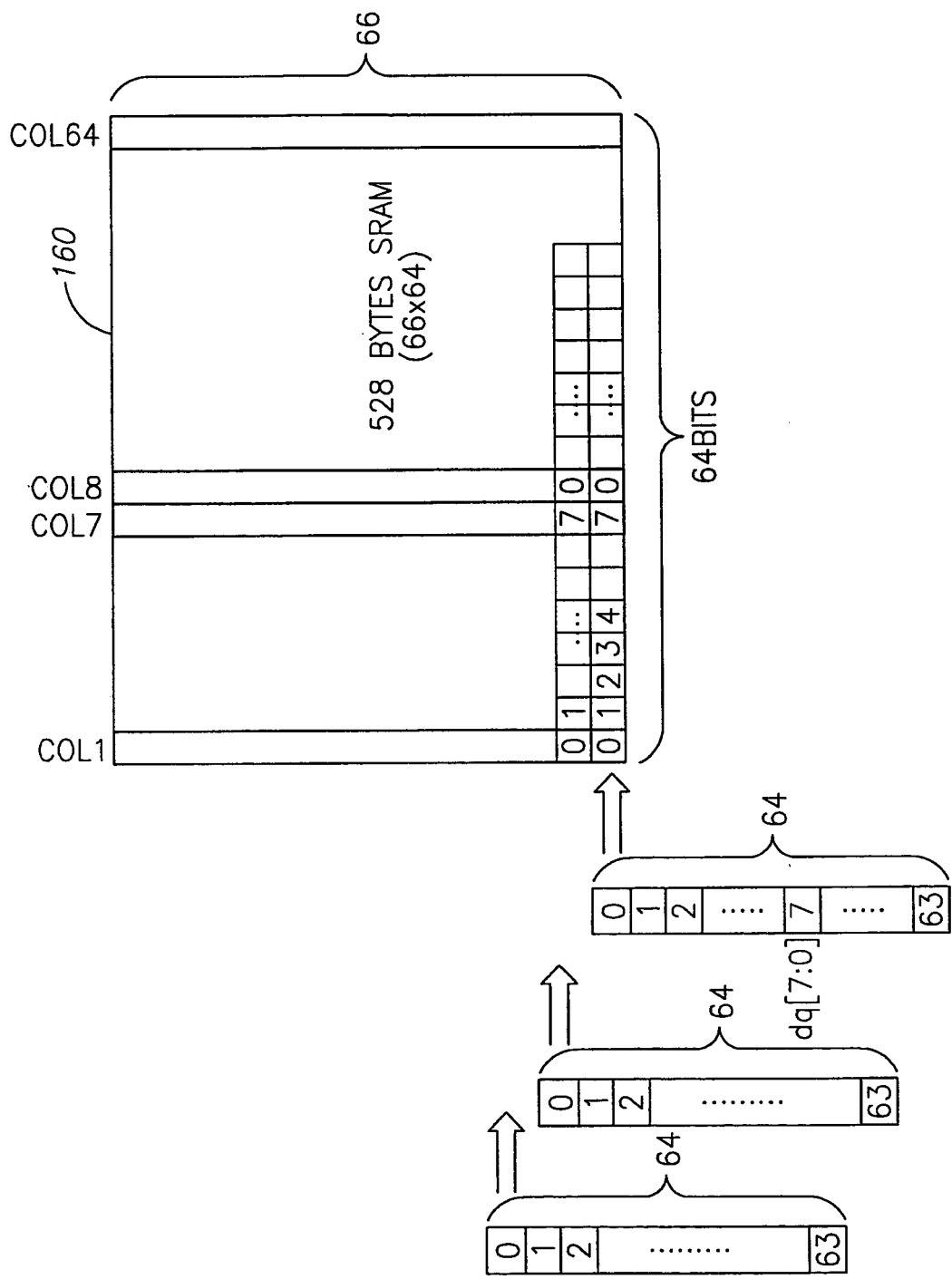
FIG. 4 is a block diagram showing an example of how bits from a column of a temporary buffer (e.g. SRAM) may be mapped to a row of an NVM array.

An almost infinite number of scrambling patterns may be used. However, one general criteria for the scrambling pattern used may be that the pattern spreads the bits of the data block apart. That is, the scrambling or spreading pattern used by the bit order scrambler 110 may cause adjacent bits in the original data block to be spread apart from one another. Looking at FIG. 4, there is shown an example of how bits from an input data block may be mapped to a memory buffer 160 when the bits are not subjected to scrambling or spreading. Adjacent bits in the data block may remain adjacent to each other within the memory buffer, and the same number bit (e.g. 0 bit) from each of a number of adjacent Bytes may be mapped to the same column and adjacent rows of the memory buffer 160.

Figure 5:
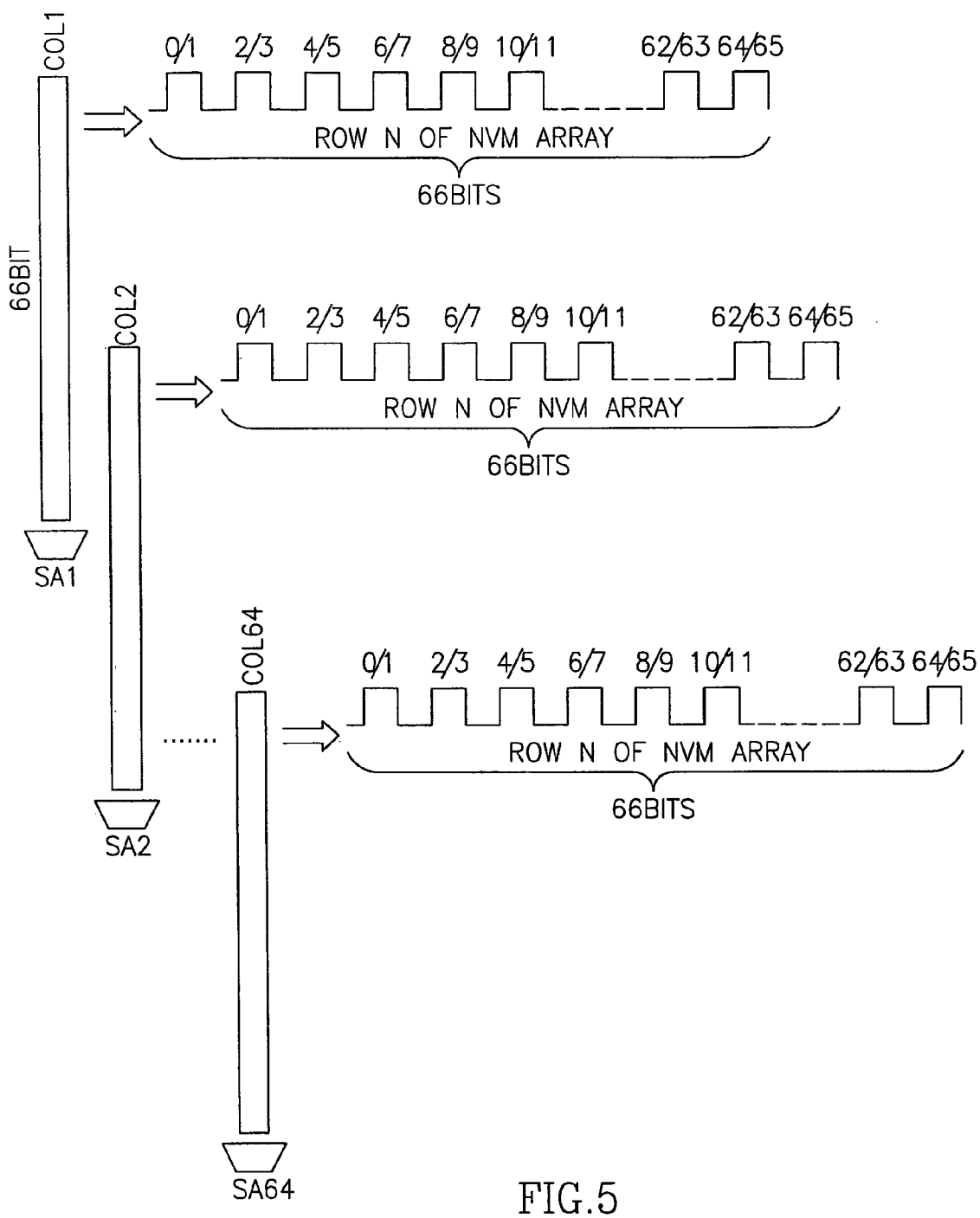
FIG. 5 is a block diagram showing an example of how bits from columns of a temporary buffer (e.g. SRAM) may be mapped to rows of an NVM array, where each cell of the NVM array may store two bits.

FIG. 5 shows how bits may be copied from a memory buffer to an NVM array. Each column of a buffer 160 may be copied to a row of memory cells on the NVM array 200. In the event that the NVM array 200 is adapted to store multiple bits on the same memory cell, several bits from the same column on the memory buffer 160 may be stored on the same memory cell of the NMV array 200.

Figure 7:
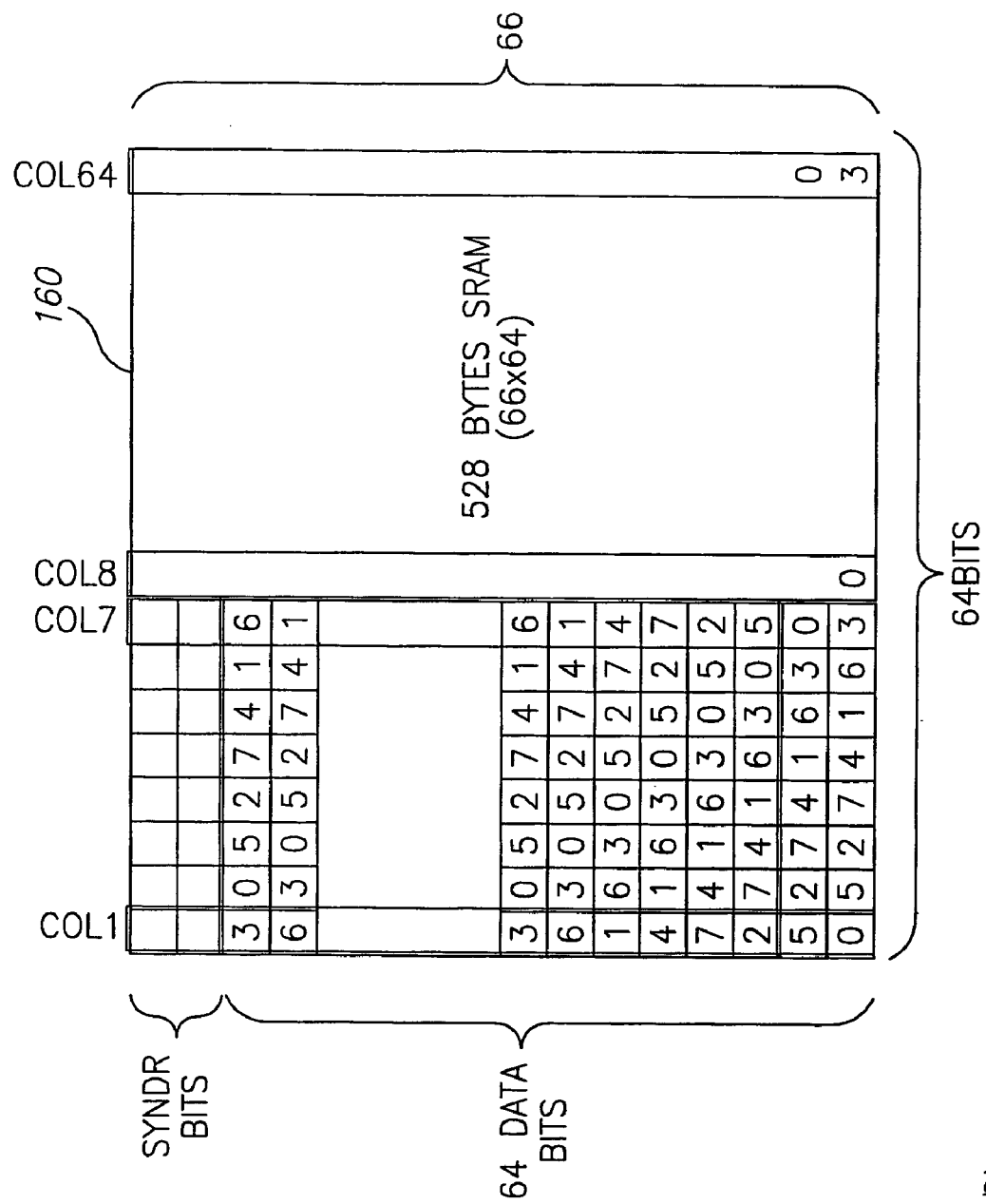
FIG. 7 is a diagram illustrating one example of how bits may be rearranged or scrambled according to some embodiments of the present invention.

FIG. 7 shows an example of a memory buffer 160 storing bits of a data block which has been scrambled or spread according to some spreading pattern. The specific pattern by which bits of a data block are spread may vary from embodiment to embodiment of the present invention.

Figure 6:
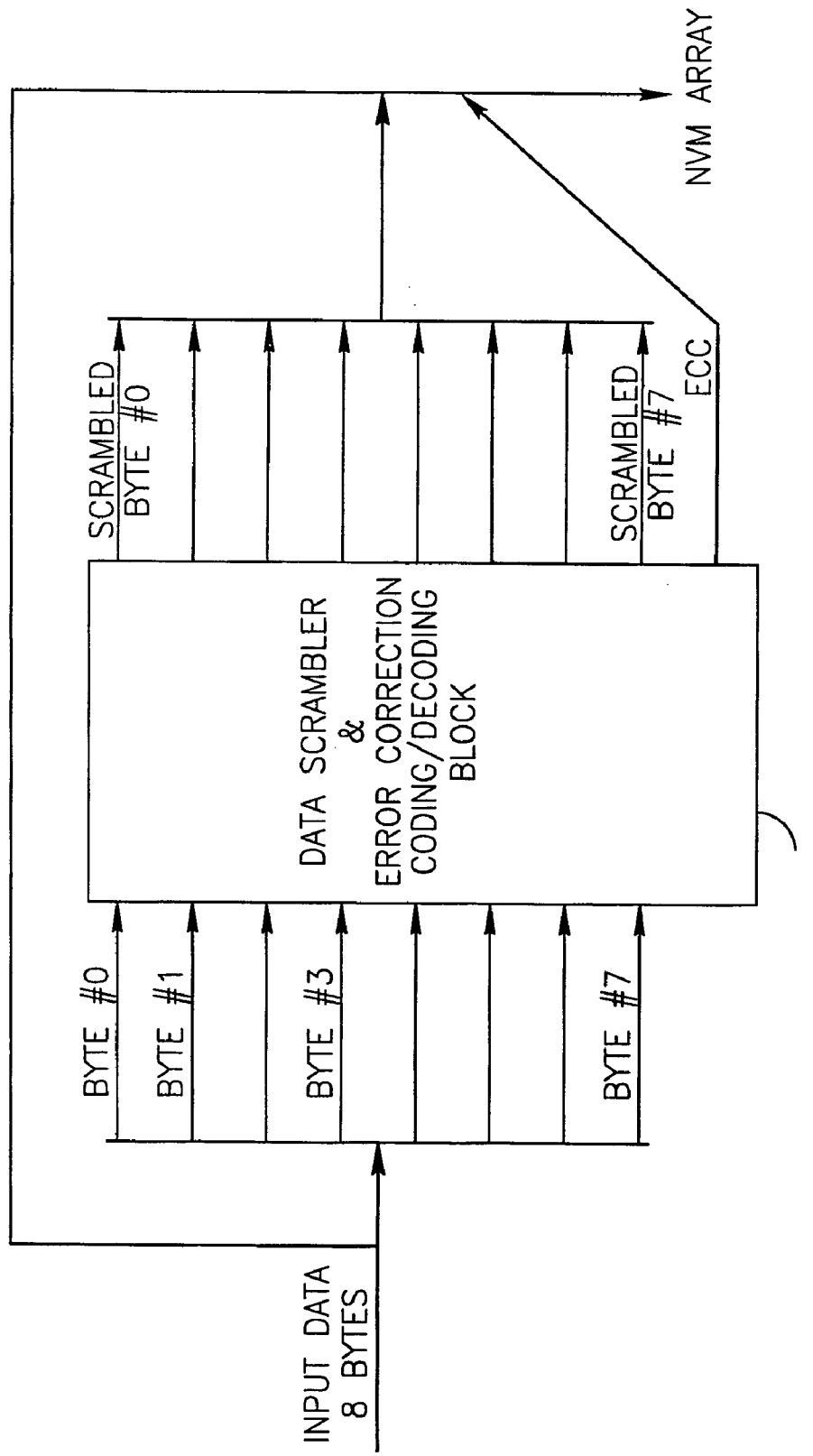
FIG. 6 is a block diagram showing a close up view of a Data Scrambler & ECC block according to various embodiments of the present invention.

Turning briefly to FIG. 6, there is shown a combination of Data Scrambler & Error Correction Coding/Decoding block 135 according to some embodiments of the present invention. As a data block enters, each of the eight Bytes of the data block may enter a separate bit examination and/or manipulation machine, where each Byte may be scrambled, examined to calculate an error correction code for the block, or both. According to some embodiments of the present invention, each number bit (e.g. bit 0 or bit 1) of each separate Byte is used to generate a separate ECC (sometimes referred to as a dq). That is, all the 0 bits of each of the eight bits are analyzed collectively to determine an ECC value for that group of bits (i.e. 0 bits group), all the 1 bits of each of the eight bits are analyzed collectively to determine an ECC for that group of bits (i.e. 1 bit group), and so on. According to other embodiments of the present invention, the bits of each Byte are first scrambled and then an ECC is generated based on the scrambled or spread bits.

Turning back to FIGS. 1 and 2, and the embodiments of the present invention shown therein, we see that after scrambling or spreading, the data block, along with its associated ECC, may be copied by a Data Write/Program Circuit 140 to the NVM Array 200 (step 3000B). In some embodiments of the present invention (FIG. 2), the scrambled data block may first be copied onto a memory buffer 160, prior to being copied to the NVM Array 200.

When attempting to read data which was stored on the NVM array, in a scrambled or spread pattern, in accordance with the above described embodiments of the present invention, inverse steps to store the data block may be used. The scrambled bits, along with their associated ECC, may be read from the NVM array (step 4000B). The scrambled bits may be de-scrambled or de-spread by the Bit Order De-Scrambler 120, using an inverse pattern to that which was used to scramble the bits (Step 5000B). The de-scrambled block of data bits may be manipulated (e.g. error bits fixed) by the Error Correction Coding Decoding block 130 in accordance with the data block's associated ECC (Steps 5000B and 6000B), thereby producing an output data block which should resemble the original input data block. In accordance with the embodiment of the present invention shown in FIG. 2, data read from the NVM array may also be buffered in a memory buffer 160.

Figure 3:
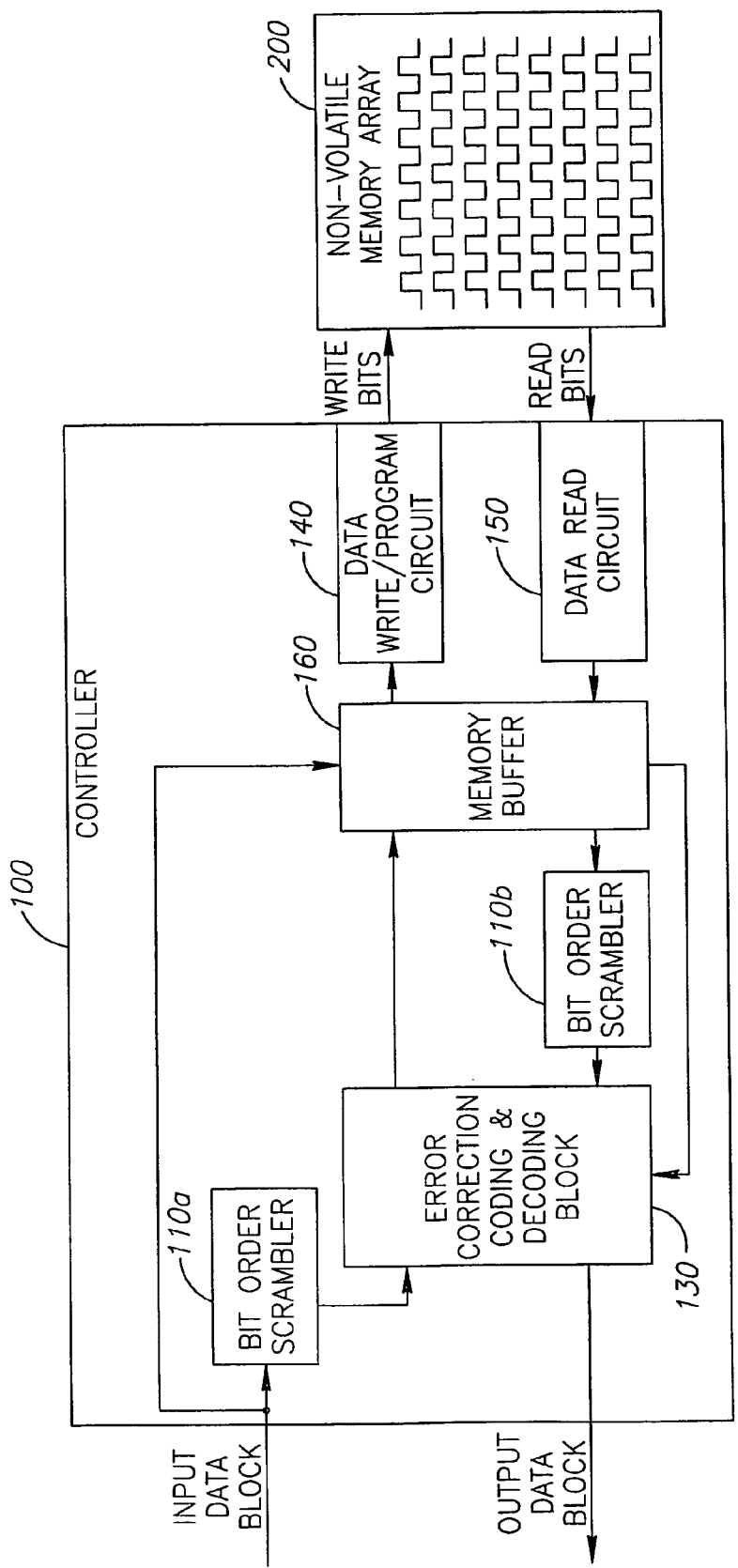
FIG. 3 is a block diagram showing an NVM array Controller with Bit Scrambler and Error Correction Coding blocks and a temporary Memory Buffer according to some embodiments of the present invention, through which data may be stored on an NVM array in a non-scrambled order.

Turning now to FIG. 3, there is shown a block diagram of an NVM array Controller 100 according to some embodiments of the present invention, including a Bit Order Scrambler blocks 110a and 110b, Error Correction Coding & Decoding block 130, memory buffer 160, Data Write/Program Circuit 140 and Data Read Circuit 150. According to embodiments of the present invention associated with FIG. 3, data blocks may be stored on an NVM Array 200 in their original, non-scrambled, order. According to embodiments of the present invention associated with FIG. 3, an input data block may have its bits scrambled or spread (Step 1000) by a Bit Order Scrambler 110a as described above, and an ECC may be generated by an Error Correction Coding & Decoding Block 130 based on the scrambled data block (Step 2000A). Although the data block is scrambled and an ECC is generated based on the Scrambled block, the original data block, in an unscrambled order, may be copied to the memory buffer 160, from which buffer 160 the Data Write/Program Circuit 140 may copy the data block, along with its associated ECC, onto the NVM array 200 (Step 3000A).

Looking briefly at the Data Scrambler & Error Correction Coding/Decoding block 135 according some embodiments of the present invention, shown in FIG. 6, it should be clear that the input data block may have parsed into sub-blocks (e.g. Bytes) and each sub-block may be scrambled and the scrambled sub-blocks may be used to calculate or determine an ECC for the block. The output of the Data Scrambler & Error Correction Coding/Decoding block 135, in accordance with an embodiment of the present invention where the original version of the data block is to be stored on the NVM array 200, may be the ECC which is based on the scrambled version of the data block. As should be clear from both FIGS. 3 and 6, the original version of the data block, or a copy thereof, may bypass the Data Scrambler & Error Correction Coding/Decoding block 135 and may be stored on the NVM array 200 along with an associated ECC which is based on a scrambled version of the data block. In an alternate embodiment of the present invention, previously described above, the Data Scrambler & Error Correction Coding/Decoding block 135 may generate an ECC based on the original unscrambled data block and may produce or output a scrambled version of the data block for storage on the NVM Array 200.

Turning back to FIG. 3, it may be seen that a data block stored on the NVM array 200 in an unscrambled order, along with its associated ECC, may be read by a Data Read Circuit 150 (step 4000A) and may be buffered in a memory buffer 160. Circuits for reading and writing bits to and from an NVM memory array, memory buffers to be used with an NVM array and controller are well known in the art. Any such circuits presently known or to be devised in the future are applicable to present invention.

Since the ECC stored with the unscrambled data block is based on a scrambled version of the data block, the Error Correction Coding & Decoding Block 130 may require a scrambled version of the read data block to perform needed error bit fixes. A Bit Order Scrambler 110b, similar or identical to the Bit Order Scrambler 110a used on the original input data block, may be used to generate a scrambled version of the data block read from the NVM array (Step 5000A). In some embodiments of the present invention, bit scramblers 110a and 110b may be the same circuit. The Error Correction Coding & Decoding Block 130 may use the scrambled version of the read data block along with the associated ECC to produce bit fixing instruction for bits of the data block which was read from the NVM array (step 6000A), thereby producing an output data block according to some embodiments of the present invention.

It will be appreciated by persons skilled in the art that the present invention is not limited by what has been particularly shown and described herein above. Rather the scope of the invention is defined by the claims that follow:

What is claimed is:

1. A control circuit for storing bits of a data block on a Non-Volatile Memory ("NVM") array, said circuit comprising:
   a bit scrambling block adapted to rearrange the bit of the data block according to a spreading pattern;
   an Error Correction Coding ("ECC") block adapted to generate an ECC based on either the original data block or on the rearranged data block;
   an NVM storing circuit adapted to store in said NVM array the ECC and the block of bits from which the ECC was not derived;
   a reading circuit adapted to read a stored block of bits from the NVM array;
   wherein said bit scrambling block is adapted to scramble the read data block if the block was stored unscrambled; and
   wherein the ECC block is adapted to manipulate the scrambled block according to an ECC which is based on a scrambled version of the original data block prior to being stored on the NVM.

2. The control circuit according to claim 1, further comprising a de-scrambler adapted to rearrange a block of bits stored according to spreading pattern.

3. The control circuit according to claim 2, wherein the ECC block is adapted to manipulate the de-scrambled block of data according to an ECC which is based on the original data block prior to scrambling.

* * * * *